United States Patent [19]
Ernst et al.

[11] 3,891,284
[45] June 24, 1975

[54] LONGITUDINALLY MOVING SHAFT BEARING

[75] Inventors: Horst Ernst, Eltingshausen; Manfred Brandenstein, Aschfeld; Armin Olschewski, Schweinfurt, all of Germany

[73] Assignee: SKF Industrial Trading and Development Company, B.V., Amsterdam, Netherlands

[22] Filed: Apr. 15, 1974

[21] Appl. No.: 461,244

[30] Foreign Application Priority Data
Apr. 17, 1973 Germany............................ 2319340

[52] U.S. Cl................................. 308/6 C; 308/201
[51] Int. Cl............................................. F16c 29/06
[58] Field of Search..................... 308/6 C, 176, 201

[56] References Cited
UNITED STATES PATENTS
3,353,246  11/1967  Farmer........................... 308/201 X
3,512,849  5/1970  Weisel............................... 308/6 C
3,751,121  8/1973  Geffner............................. 308/6 C Primary Examiner—M. Henson Wood, Jr.
Assistant Examiner—Gene A. Church
Attorney, Agent, or Firm—Murray Schaffer

[57] ABSTRACT

A ball bearing for journalling shafts, axles and the like for longitudinal movement having a hollow cylindrical cage in which a plurality of closed-end ball guides are uniformly spaced about its circumference. Each guide is formed of a pair of axial and a pair of interconnecting arcuate end grooves in which the balls are retained. One axial groove of each pair is open with a narrow slot to the inner bore of the cage to permit the balls to engage the shaft or axle located therein, and open to the exterior of the cage. The balls are covered by a rail having a race surface engaging the balls. Each of the rails are interconnected in a cover assembly by being connected at only one end to the other rails.

21 Claims, 12 Drawing Figures

PATENTED JUN 24 1975　　3,891,284

SHEET　1

LONGITUDINALLY MOVING SHAFT BEARING

BACKGROUND OF THE INVENTION

The present invention relates to ball bearings for supporting and journalling axially or longitudinally movable shafts, axles or the like.

A ball bearing for the foregoing purpose is known wherein a cage is provided with axial grooves adapted to receive balls. The cage slots are open on their interior bore to engage the shaft exteriorly in order to be inserted. The exterior of the ball grooves are closed by a metal sleeve, in which slots are formed, through which the balls project. Since the slots must be held smaller than the diameter of the balls, it is not possible to exert a sufficient pressure through the sleeve, on to the balls, from the exterior. As a result the assembly of the bearing is difficult. Furthermore, in this device the balls run on the cylindrical inner surface of the sleeve, resulting in unfavorable engagement conditions so that the load capacity of this bearing is relatively small.

To overcome these disadvantages, a bearing of this type has become known in which a plastic cage is employed, and in which each of the exposed cuts forming the guide grooves for the balls in their load bearing conditions, are covered with individual steel plates. These plates are secured after insertion of the balls, along both edges of the groove by being snapped into the sides of the grooves of the plastic cage, from the exterior. Each plate is impressed on its face to form a race surface, for the balls, providing favorable contact conditions and thereby providing an increased load bearing capacity for the device. A disadvantage of this construction lies in the fact that the steel plates are not adequately secured in the axial direction, relative to each other, or relative to the plastic cage. As a result under load conditions they tend to slide. Also, it is to be noted, that the individual steel plates tend to have different manufacturing tolerances and wall thickness so that a uniform bearing pressure can not be obtained on all the balls except by the use of relatively expensive manufacturing methods, (e.g. careful sorting, inspection and matching of the parts). A further disadvantage arises from the use of large members of parts, which may be easily lost and/or erroneously inter-exchanged. As a result the assembly of the bearing is made more difficult and costly.

These disadvantages hold true for even another embodiment in which the individual steel plates, cut at each end, are provided with a retaining ring set with the cuts and held within a groove in the plastic cage. Here, in addition, because of the extremely small space available, the retaining ring must be formed of very thin walled material. As a result it usually must be made of plastic and heat shrunk into place. Consequently, the retaining ring is easily destroyed and cannot carry out its function over long periods of time.

The object of the present invention is to provide a ball bearing for supporting and journalling loads such as shafts, axles or the like having longitudinal movement, which overcomes the disadvantages of the known constructions.

It is further an object of the present invention to provide a bearing of the type described having a higher load bearing capacity and increased efficiency.

It is another object of the present invention to provide a bearing of the type described in which greater uniformity of pressure and manufacturing tolerances are obtained for each of the rows of axially arranged load bearing balls.

It is a particular object of the present invention to provide a bearing of the type described, in which the balls are held by race rails which are securely fixed about the cage, in both the axial and radial directions.

It is still another object of the present invention to provide a bearing of the type described which employs few individual parts, which is easily assembled and which does not require any great expenditure of technical effort to produce.

These objects together with other objects and advantages will be apparent from the following disclosure of the present invention.

SUMMARY OF THE INVENTION

According to the present invention a bearing for supporting and journalling loads having axial movement of the type described is provided comprising a cover assembly in which the retaining rails, covering the individual rows of balls, are formed unitarily by being connected at only one end to each other and secured on the ball cage, which may be preferably formed of plastic material. The retaining rails may be connected to each other at alternately opposite ends in a sinuous pattern, or at the same end by a connecting ring.

As a result of the present invention the various retaining rails are joined together so that they can not be individually lost or erroneously interchanged. Importantly, however, the present invention allows the simple and easy production of uniform retaining rails and precisely formed race surfaces, by which a high load bearing capacity can be obtained.

In accordance with the present invention the cover assembly is made of a piece of flat sheet metal from which the individual rails, impressed with their rail surface and connecting members are shaped. In one form the assembly is made from a flat circular disk, wherein on forming the rails and race surfaces, the material between the rails is cut away leaving a flat sheet having an annular ring, and a plurality of radial spokes corresponding to the rails extending therefrom. Thereafter, the spokes are bent, into the axial direction. The construction of the assembly from a single piece of flat sheet metal reduces significantly differences in wall thickness between the individual rails and in addition to resulting in a unitary assembly results in a more uniform and efficient device.

The cover assembly may be formed in basically the same way, from a piece of flat elongated sheet material, which after formation of the rails, connecting members or members, and race surfaces is cut to remove the intermediate areas and leave rails as transversely extending teeth or tongues. Thereafter the elongated strip is rolled to form a cylinder with the teeth converted into the rails extending axially.

Further, in accordance with the present invention, the connecting portion and/or the free ends of the rails are so formed that an exact axial securement of the individual rails can be effected, relative to each other and relative to the ball cage. In one form the free end of the rails are provided with projections, tabs, prongs or the like, which snap into correspondingly formed cut outs beneath its surface of the cage. In another form the free ends of the rails may be bent over the edge of the cage, or held by a recess formed in the cage.

Full details of the present invention are set forth in the following description of the preferred embodiments of the invention and in the accompanying drawings.

DESCRIPTION OF INVENTION

Figure 1:
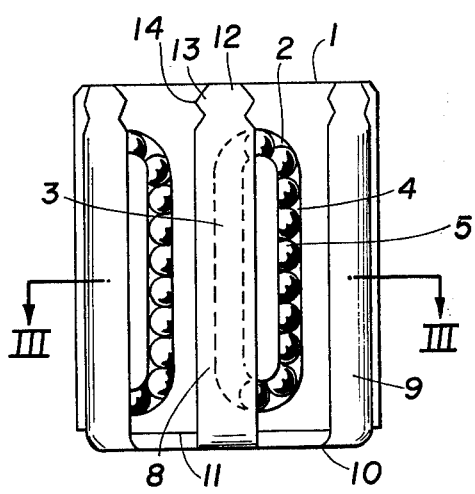
FIG. 1 is a side elevational view partially in section of a bearing embodying the present invention.
Figure 2:
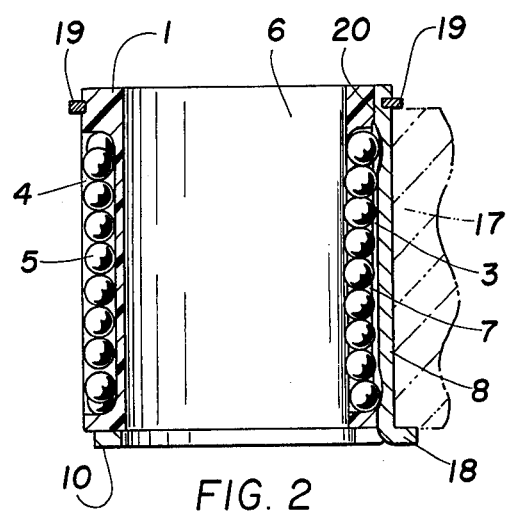
FIG. 2 is an axial sectional view of the bearing of FIG. 1.
Figure 3:
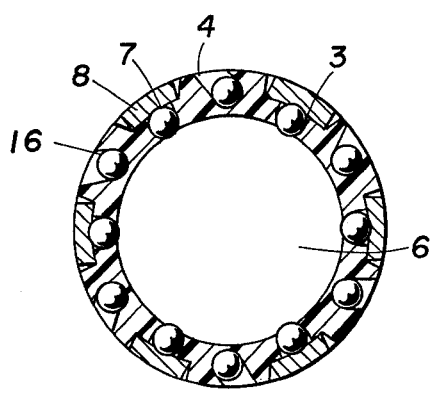
FIG. 3 is a sectional view of the bearing of FIG. 1 taken along line III — III.

A ball bearing adapted for the support of longitudinally moving shafts, axles or the like according to the present invention is shown in FIGS. 1 – 3. The bearing comprising a hollow tubular ball cage 1, which is divided, on its outer circumference, into a plurality of recessed oval ball guides. Each of the ball guides comprises a pair of semi-circular end grooves 2 joining a pair of parallel axially directed linear grooves 3 and 4, in which the balls 5 are guided and held to roll in a continuous (i.e. closed) path. As seen in FIG. 3, the guide groove 3 is offset radially inward toward the center of the cage and is open (in a long narrow slot) to the bore 6 of the cage, which slot is smaller than the diameter of the balls 5. The guide groove 3 thus serves to hold the balls 5 outwardly into the bore 6 in load contact with a shaft or axle (not shown) inserted within the bore 6 of the cage. The slots 3, open widely to the outer surface of the cage, and the balls 5 are retained in the individual groove 3 by a race 7 formed on an elongated rail 8.

All of the rails 8 are integrally connected at one end 9 to an end ring 10 to form a unitary cover assembly. The end ring 10 is radially flanged and lies against the lower frontal end 11 of the cage 1. The rails 8 seat within axial slots in the cage, extending from the bottom 11 to its upper edge, as seen in FIG. 3. The upper or free end 12 of each of the rails 8 is provided with a laterally projecting tab 13 which engages within a correspondingly formed under cut 14 in the axial slots beneath the outer jacket face of the cage 1. The projections 13 lodging in the undercuts 14 cooperate with end ring 10 to axially fix and secure the rails 8 in their proper position. In order to maintain the overall radial dimension as small as possible, the thickness of the rails 8 preferably conforms to the depth of the axial slots, and may be made as thin as is physically possible.

Figure 4:
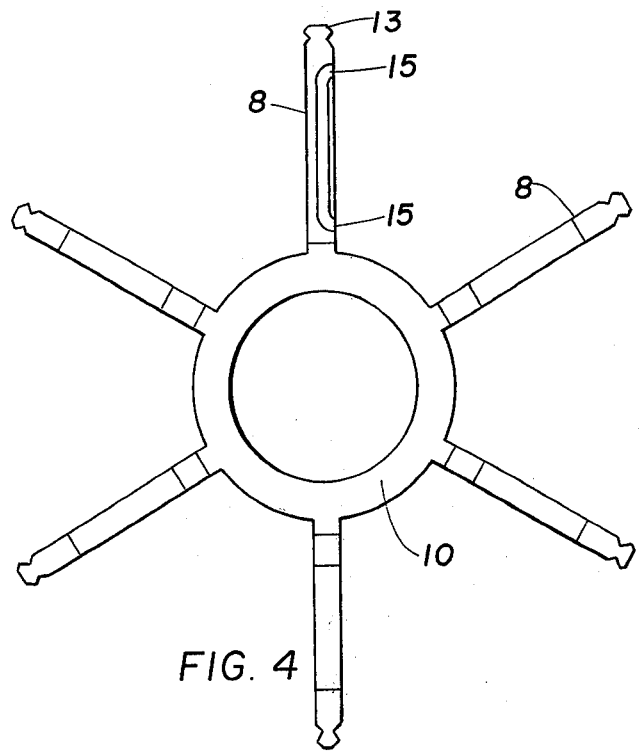
FIG. 4 is a plan view of the cover assembly showing the rails and end ring during the process of their formation.

As seen in FIG. 3, the ball races 7 and as seen in FIG. 4, the ducts 15 are stamped in the form of grooves conforming to the balls 5 by which the osculation between the race and the balls is improved, thereby raising the level of the load bearing capacity of the device.

The guide grooves 4 which serve to divert the balls 5 from the load bearing zones open on the outer surface of the cage 1 and are closed to the inner bore surface. A small projection 16 runs axially along the length of one side of the groove 4 preventing the balls 5 from falling out. A corresponding projection can also be formed on the opposite side of the groove 4 if desired. The side walls of the guide groove 4 preferably do not extend radially, but instead parallel to the side walls of the associated guide groove 3. In this way, during manufacture of the cage by either injection molding or casting, a common slide or mold can be employed for each pair of associated guide grooves 3 and 4.

The bearing is housed in an outer wall, bushing or pillow block 17. As seen in FIG. 2, the bottom end ring 10 is provided with a plurality of lateral tabs 18 which are cut or pressed from the ring 10 and bent to extend radially outward, below the wall 17. The axial securement of the bearing is insured by further providing a spring clamp 19 fitting in an annular slot 20 formed at the upper end of both the rails 8 and the cage 1, which engages the upper surface of the wall 17.

A suitably advantageous method of forming the end ring and rail comprising the cover assembly is shown in FIG. 4. A flat sheet metal blank such as a circular disk is used as a starting workpiece in which the race surfaces 7 and the duct zones 15 are ground or impressed. Thereafter, the intermediate areas between the rails 8 are removed, as by cutting, stamping or punching, so that a star shaped flat member is formed as seen in FIG. 4. By such a stamping process the projections 13 are also formed. Lastly, the rails 8 are bent upwardly from the end ring portion to take a parallel axial position as seen in FIG. 5. In order to make this bending operation easier, it is preferable to work or provide the material with score lines 21 either by pressing or removing material from the corner. As will be obvious from FIG. 5, the completed cover can be easily shoved, in an axial direction, over the cage with the rails 18 fitting in the axial slots, until the projections 13 engage in the undercuttings 14.

Figure 5B:
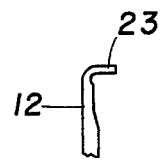
FIGS. 5a and 5b are two enlarged detail views of the construction of the free end of the rails.
Figure 5:
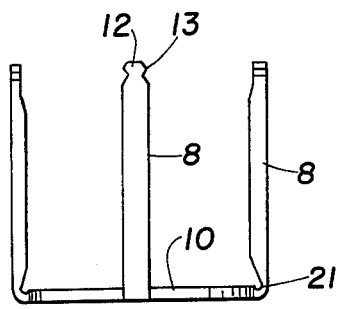
FIG. 5 is an elevational view of the cover assembly of FIG. 4 after completion but prior to installation on the cage.
Figure 5A:
Figure 6:
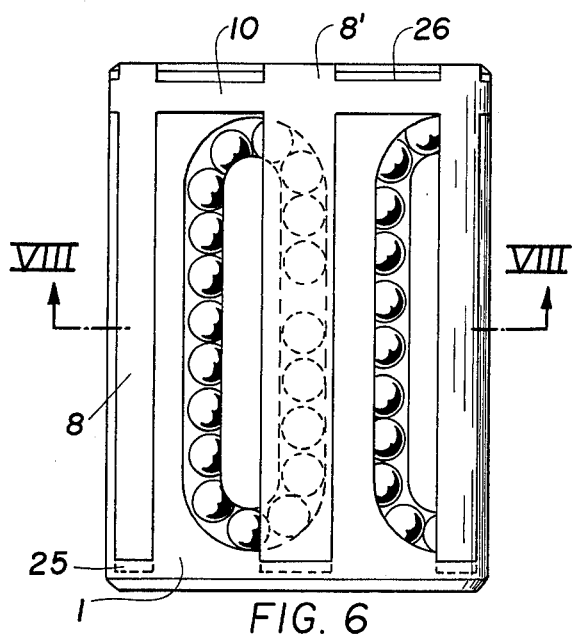
FIG. 6 is a view similar to FIG. 1 showing a second embodiment of the present invention.

In the sectional views of FIGS. 5a and 5b, two other possibilities are shown for providing means for axially fixing the cover assembly. In FIG. 5a, the free end 12 of one or more rails 8, is offset radially inward to form a shoulder 22 which can resiliently grasp beneath a correspondingly formed shoulder provided along the upper edge of the cage 1. In FIG. 5b the free end 12 of one or more rails 8 is bent radially inward to form a tab 23. The tab 23 engages over the frontal edge of the cage 1 and thus fixes the end ring and rail cover assembly in the axial direction.

Figure 7:
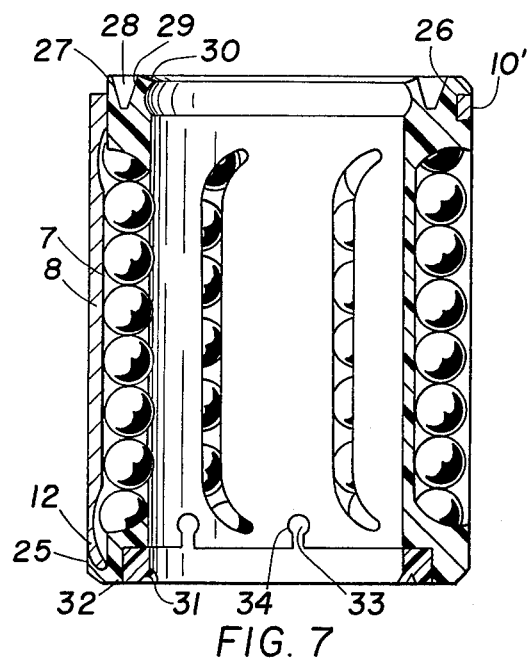
FIG. 7 is a view similar to that of FIG. 2 showing in cross-section the embodiment of FIG. 6.

In FIG. 6 through FIG. 9 another embodiment of the invention is shown. For uniformity and clarity, the same reference numbers as in FIGS. 1 – 5 will be used for similar elements. In this embodiment the cover assembly is formed from a flat elongated strip of metal 24 seen in FIG. 9, in which the races 7 and transitional duct zones are worked in conventional manner, along transverse spaced lines. Thereafter the material between the rails 8 is removed, leaving a connecting strip 10' to form a comb-like member. The comb-like workpiece 24 is then rolled into a cylinder and welded or soldered along its abutting seam. The free ends 12 are then pressed slightly inwardly so as to fit within corresponding cut outs 25 formed along the exterior surface of the lower edge of the cage, as seen in FIG. 7. This prevents the rails 8 from springing radially outward away from the cage, and obviates the need for the projections shown in FIGS. 1 – 5.

Figure 9:
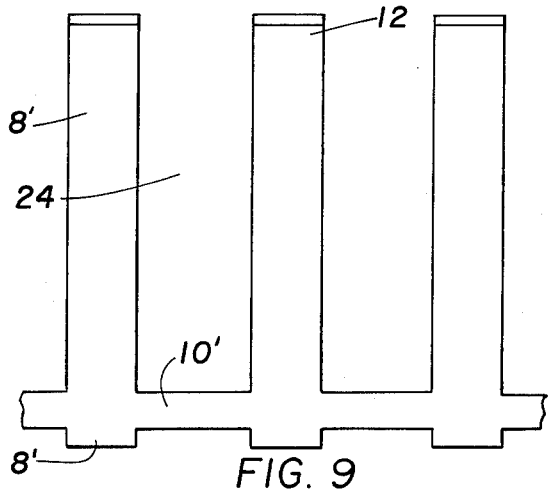
FIG. 9 is a plan view showing a second method for forming the cover assembly.
Figure 8:
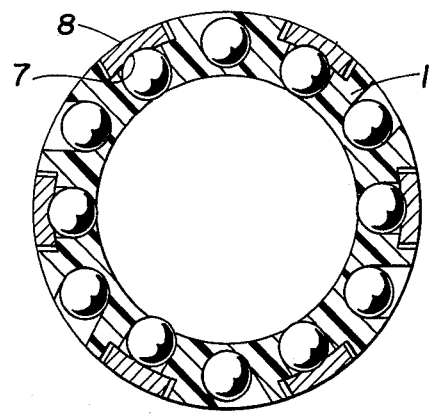
FIG. 8 is a sectional view along line VIII — VIII of FIG. 6.

As seen in FIG. 9, a small portion 8' of the rails extends beyond the connecting ring 10' and are bent to engage over corresponding slits in the other end of the cage, serving to securing the rails.

To axially secure the cover assembly, an annular groove 26 is cut at the upper end of the cage into which the connecting end ring 10' seats. The cage is further provided on its frontal face 27, with a V-shaped annular groove 28 having an annular ring portion 29 bent inwardly to form a lip 30 making it elastically yielding thus enhancing its resilient absorption characteristics.

In the embodiment of FIGS. 6 to 9 an inner annular area 29 formed with the lip 30 serves to seal the interior bore about the not shown shaft. The lip 30, however, slides on the surface of the shaft and prevents the loss of lubricant from within the bore 6 and the introduction of dirt therein. In the lower half of FIG. 7 another seal means is shown. An inner lip 31 is provided on a separable ring 32 made of resilient sealing material. The ring 32 is provided along its axial inner edge with a plurality of projecting knobs 33 which resiliently snap into corresponding holes 34 made along the edge of the cage.

Figure 10:
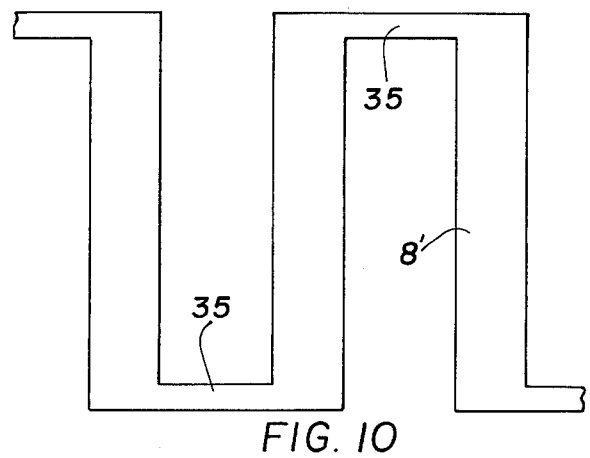
FIG. 10 is a plan view showing a third method for forming the cover assembly.

In FIG. 10 there is shown a further example by which the cover assembly is formed. The rails 8 with their formed races 7 and duct zones are formed in a flat sheet metal workpiece in the manner of FIG. 9; however, here the rails 8 are joined serially by connecting members 35 along alternate edges to provide a Greek key or fret pattern. This serpentine pattern can be easily rolled into the cylindrical shape and slid over the cage 1 in the manner shown in FIGS. 6 and 7, with the connecting members 35 seating within corresponding slots just as the connecting ring 10' and be fixed so as to be axial and radially secure.

The present invention is not limited to the forms illustrated and described. Furthermore, a variety of changes are possible. Following are but a few of the more important ones. The end ring on which the rails are connected, as well as the cage 1 can be slotted so as to provide a degree of clearance, making the bearing to a degree self-adjustable. By stamping out grooves in the end ring, in the area of the integral connection with the rails, a degree of spring bias or yieldability is obtained. The surface of the rails 8 in the area of their races can be shaped by the use of such grooves or recesses to provide an elastic bias.

Also for certain assemblies it is advantageous to shape the rail so that its outer surface, i.e. the surface lying opposite to the ball race, is provided with a spherical bowing in the axial direction. The ends of the rails can thus be slanted and made resilient, so that an adjustment of the bearing can be obtained, und undesirable pressure against the end of the bearing can be avoided.

Still further, it will be clear, that the material used to form the rails need not be limited to sheet metal. It will be obvious that other materials such as plastic can be employed. If plastic is used, it may be helpful, for example, to form the race surfaces with a metal coating which may be laminated, or deposited as by vacuum-forming or some other conventional process. In similar manner, the ball cage need not be produced only from plastic material, but may be formed from metal or other materials.

Various changes, modifications and embodiments have been suggested in the foregoing description, others will be obvious to those skilled in the art. It is intended therefore that the present disclosure be taken as illustrative only and not as limiting of the present invention.

What is claimed is:

1. A ball bearing for journalling longitudinally moving shafts, axles or the like comprising a hollow cylindrical cage having an inner bore adapted to receive said shaft, said cage having a plurality of closed end ball guide paths uniformly spaced about its circumference, each guide being formed of at least one axial groove in which the balls are retained, said axial groove being open to the inner bore of the cage to engage the shaft therein and open to the outer surface of said cage, each axial groove having a rail located in the outer opening, said rail having a race surface engaging the balls in said groove, the rails for all of said grooves being interconnected at only one end to each other to form a cylindrical cover for said cage.

2. The bearing according to claim 1 wherein each guide path includes a second axial groove and pair of end grooves connecting said axial grooves.

3. The bearing according to claim 1 wherein said rails are interconnected at alternate opposite ends in a sinuous pattern and formed into a cylindrical sleeve.

4. The bearing according to claim 1 wherein said rails are interconnected at a corresponding one end by an annular member.

5. The bearing according to claim 1 wherein said cover assembly is secured to said cage against axial movement.

6. The bearing according to claim 5 wherein the free ends of said rails are secured to said cage against relative movement with respect to each other and/or with respect to said cage.

7. The bearing according to claim 4 wherein said annular member is secured to said cage to prevent axial movement of said cover.

8. The bearing according to claim 1 wherein the free end of at least one of said rails is provided with projections and the cage is provided with a corresponding recess to receive said projections.

9. The bearing according to claim 7 wherein the free end of at least one of said rails is provided with an inwardly bent tab adapted to engage over the end of said cage.

10. The bearing according to claim 9 wherein the end of said cage is formed with a recess for receiving said tab.

11. The bearing according to claim 3 wherein said cage is formed with recesses for receiving the free end of said tabs.

12. The bearing according to claim 3 wherein said cage is formed with recesses for receiving the interconnecting portions of said cover.

13. The bearing according to claim 1 wherein the interconnection between said rails is split.

14. The bearing according to claim 1 wherein the outer surface of said rails is bowed in the axial direction.

15. The bearing according to claim 1 wherein the outer surface of said rails is provided with recesses.

16. The bearing according to claim 1 wherein said cage is provided with seal means at at least one end.

17. The bearing according to claim 16 wherein said seal means is formed by providing the end of said cage with an inwardly directed lip.

18. The bearing according to claim 16 including a resilient annular seal ring secured to the end of said cage.

19. The bearing according to claim 1 wherein said cover is formed from a single piece of sheet metal.

20. The bearing according to claim 19 wherein said cover is formed from a flat round sheet to have a central annulus and a plurality of radially extending spokes each having a race surface, and thereafter bending said spokes with respect to the annulus into parallel axial directions.

21. The bearing according to claim 19 wherein said cover is made from an elongated flat sheet in which a plurality of transversely extending tongues are formed joined to each other at one end only and thereafter rolled into a cylinder.

* * * * *